(12) United States Patent
Hasegawa et al.

(10) Patent No.: US 7,366,547 B2
(45) Date of Patent: Apr. 29, 2008

(54) COMMUNICATIONS APPARATUS THAT DISPLAYS DATA IN A STANDBY SCREEN

(75) Inventors: Junichi Hasegawa, Yokohama (JP); Kouji Nakazato, Yokohama (JP)

(73) Assignee: Kyocera Corporation, Kyoto (JP)

( * ) Notice: Subject to any disclaimer, the term of this patent is extended or adjusted under 35 U.S.C. 154(b) by 18 days.

(21) Appl. No.: 10/902,419

(22) Filed: Jul. 29, 2004

(65) Prior Publication Data
US 2005/0026657 A1     Feb. 3, 2005

(30) Foreign Application Priority Data
Jul. 29, 2003   (JP)   ............... 2003-203130
Sep. 30, 2003   (JP)   ............... 2003-342650

(51) Int. Cl.
H04M 1/00   (2006.01)
H04Q 7/20   (2006.01)
H04B 7/00   (2006.01)

(52) U.S. Cl. ............... 455/566; 455/575.1; 455/556.2; 455/425; 455/66.1; 455/90.3; 379/419; 379/440

(58) Field of Classification Search ............... 455/566, 455/550.1, 424, 425, 575.1, 575.3, 66.1, 455/90.3; 379/419–440
See application file for complete search history.

(56) References Cited

U.S. PATENT DOCUMENTS 5,870,683 A * 2/1999 Wells et al. ................ 455/566
6,166,728 A * 12/2000 Haman et al. ............... 715/719
6,408,191 B1 * 6/2002 Blanchard et al. .......... 455/566
6,473,628 B1 * 10/2002 Kuno et al. ................. 455/566
6,522,347 B1 * 2/2003 Tsuji et al. .................. 715/848
2004/0142720 A1 * 7/2004 Smethers ................. 455/550.1

FOREIGN PATENT DOCUMENTS

| JP | 04-207639 | 7/1992 |
| JP | 2001-101098 | 4/2001 |
| JP | 2002-208993 | 7/2002 |

* cited by examiner

Primary Examiner—Lester Kincaid
Assistant Examiner—Emem Stephen
(74) Attorney, Agent, or Firm—Hogan & Hartson LLP

(57) ABSTRACT

A communications apparatus able to attach to a standby screen of a mobile phone a plurality of memos adjustable in position and adjustable in size and able to execute communications data included in a memo by a simple action from a selected memo, provided with a display portion for displaying a standby screen, an operation portion including a plurality of keys, and a control circuit enabling an attached memo corresponding to text data extracted by a user from a memory to be converted to a window having a certain display region and displayed in parallel and controlling the display portion to display at least part of the text data in that window, whereby a user does not have to operate the keys of the operation portion to display the content of a memo and can easily recall the matter of the memo since the content of the memo is continuously displayed on the standby screen.

14 Claims, 17 Drawing Sheets

FIG.14

| (A) MATTERS RECORDABLE IN ATTACHED MEMOS | | (B) CONTENT DISPLAYED IN CASE OF "ICON+MEMO" |
|---|---|---|
| MEMO BOOK | | FIRST EIGHT WORDS OF CONTENT OF MEMO BOOK |
| ADDRESS BOOK | | NAME>DISPLAYED IN PRIORITY ORDER OF ADDRESS BOOK |
| | 1 CASE | |
| | TEL. NO. | NAME> TEL. NO. |
| | MAIL ADDRESS | NAME> MAIL ADDRESS |
| URL | | NAME> URL |
| SCHEDULE LIST | | BUSINESS |
| TASK LIST | | BUSINESS |
| PHOTO ALBUM | | COMMENT |
| DATA FOLDER | | NAME OF DATA |
| LIST OF FAVORITES | | TITLE> URL |
| MY SPOT | | TITLE> NO DISPLAY |

COMMUNICATIONS APPARATUS THAT DISPLAYS DATA IN A STANDBY SCREEN

BACKGROUND OF THE INVENTION

1. Field of the Invention

The present invention relates to a communications apparatus such as a mobile phone able to communicate wirelessly and to utilize text data displayed on a display device.

2. Description of the Related Art

Along with the increasingly sophisticated functions given to mobile phones in recent years, mobile phones are now being used for sending and receiving e-mail, for browsing web pages, etc. Through this, large amounts of data are now being stored and managed in mobile phones. Mobile phones are handling larger amounts of data as a result of such processing.

For example, mobile phones are wirelessly connecting to base stations (BS) and accessing the World Wide Web (WWW) on the Internet, utilizing e-mail, and otherwise communicating data from the base stations through packet control devices and packet gateways converting the data to IP addresses and mobile phone numbers. As a result, large amounts of data (text data, image data, audio data, etc.) are being acquired by mobile phones.

Further, even when not communicating wirelessly, users are inputting text into their mobile phones, using the cameras attached to their mobile phones to take pictures, and utilizing other applications to load various types of data into their mobile phones.

In this way, the function of extracting just the information which the users need from the large amounts of data being routinely entered into mobiles phones and reminding the users of the extracted required information is becoming extremely important for recent multifunction, large data capacity mobile phones.

Various proposals have been made regarding mobile phones having such functions (for example, see Japanese Unexamined Patent Publication (Kokai) No. 2001-101098).

In conventional mobile phones, text memos were able to be attached to the standby screens (initial screens displayed when turning on the mobile phones and not yet communicating) to remind the users of specific information, but there was only a single region for displaying the memos. Therefore, when a user attached a favorite image to the standby screen of the mobile phone, there was the disadvantage that the presence of the memos on the standby screen obstructed the view of the image.

Further, in conventional mobile phones, the keys of the mobile phone could be operated to display the memos on a separate screen from the standby screen, but with this there was the disadvantage that the function of impressing upon the user the existence of the memos could not be realized.

SUMMARY OF THE INVENTION

An object of the present invention is to provide a communications apparatus enabling various types of data to be attached to a standby screen in the form of memos by a mode tailored to user preferences.

To achieve this object, according to a first aspect of the present invention, there is provided a communications apparatus for wireless communications comprising an input portion including a plurality of keys, a display portion at least displaying a standby screen when the communication apparatus is in a standby mode, a storage portion storing at least text data, and a control portion arranging data display regions on the standby screen in parallel and controlling the display portion so as to display on the data display regions at least part of the text data selected by the input portion.

Preferably, the apparatus has a text display mode and, the text data is stored linked with symbols in the storage portion, and the control portion controls to display the symbols together with at least part of the text data on the data display regions in the text display mode.

More preferably, the apparatus further has a symbol display mode and the control portion causes the symbols to be displayed without the text data at the data display regions in the symbol display mode.

Still more preferably, the control portion causes data display regions of the symbol display mode to be displayed smaller than data display regions of the text display mode.

Preferably, the display regions are selectable by input portion, and the control portion controls the display portion so as to change display order of arrangement about the data display regions selected by the input portion.

Alternatively, the control portion controls the display portion so as to switch between display and nondisplay of the data display regions on the standby screen with one operation of the input portion.

Alternatively, the display regions are selectable by input portion, and the control portion causes any of the data display regions to be stored in the storage portion linked with the text data, and causes text data corresponding to a selected data display region to be displayed on the display portion when one data display region is selected and the input portion is operated.

In the latter case, preferably, the apparatus further has a wireless communications portion transmitting data based on communications information and the control portion causes the display portion to display character strings which means the communication information differentiated with text data other than the character strings when the displayed text data has the character strings.

More preferably, the control portion controls the wireless communication portion to start transmission based on the communication information linked with the character strings when a character string is selected and the input portion is operated.

According to a second aspect of the invention, there is provided a communications apparatus for wireless communications comprising an input portion including a plurality of keys, a display portion at least displaying a standby screen when the communication apparatus is in a standby mode, a storage portion storing execution data on which a predetermined application is to be executed, and a control portion arranging data display regions on a predetermined screen on the standby screen in parallel and controlling the display portion so as to display on the data display regions information related to the execution data selected by the input portion.

Preferably, the control portion arranges the data display regions on a second screen different from the predetermined screen in parallel, and controls the display portion so as to display one of the predetermined screen and the second screen in accordance with a predetermined operation of the plurality of keys.

More preferably, the control portion changes display from one side to another side by predetermined operation of the plurality of keys while displaying the predetermined screen or second screen.

Alternatively, the apparatus further has first display mode that the control portion controls the display portion to display only symbols linked with said execution data, and second display mode that the control portion controls the display portion display to display said symbols and data contained in the execution data, and the control portion selects the first display mode or second display mode as information related to execution data by operation of the plurality of keys.

In the latter case, preferably, the execution data contains various types of data and said control portion displays as execution data according to a predetermined order of priority.

Alternatively, the apparatus further has first display mode that the control portion controls the display portion to display only symbols linked with the execution data, and second display mode that the control portion controls the display portion display the symbols and data contained in said execution data, and the control portion selects the first display mode or second display mode as information related to execution data by operation of the plurality of keys, and sets one of predetermined screen and second screen to first display mode, and sets the other to second display mode.

Alternatively, the controls the wireless communication portion to start transmission based on the communication information linked with a the character string when the character string is selected and the input portion is operated.

Alternatively, the control portion controls said wireless communication portion to start transmission based on said communication information linked with a said character string when said character string is selected and the input portion is operated.

BRIEF DESCRIPTION OF THE DRAWINGS

These and other objects and features of the present invention will become clearer from the following description of the preferred embodiments given with reference to the attached drawings, wherein:

FIGS. 1A and 1B are views of the appearance of a mobile phone according to a preferred embodiment of the present invention, wherein FIG. 1A is a view of the state where the mobile phone case is closed and FIG. 1B is a view of the state where the mobile phone case is opened;

FIG. 14 is a view of the priority order of text displayed in an attached memo in a mobile phone according to the fourth embodiment of the present invention;

DESCRIPTION OF THE PREFERRED EMBODIMENTS

Preferred embodiments of the present invention will be described in detail below while referring to the attached figures.

Figure 1A:
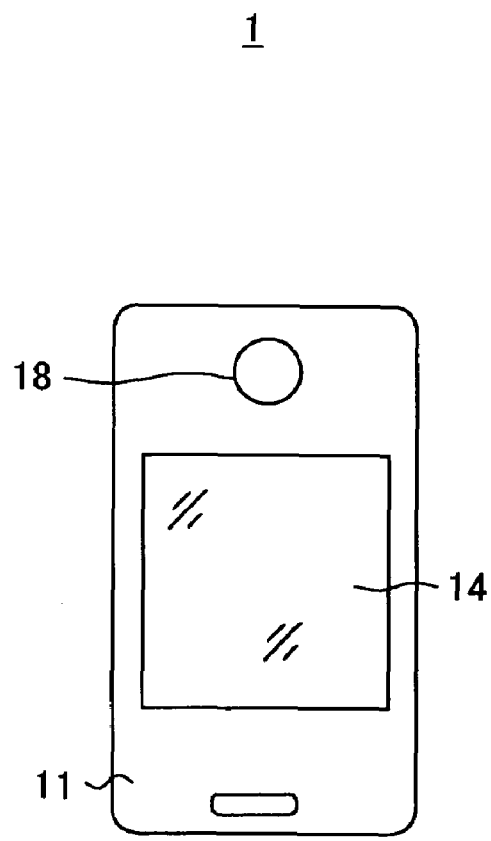
Figure 1B:
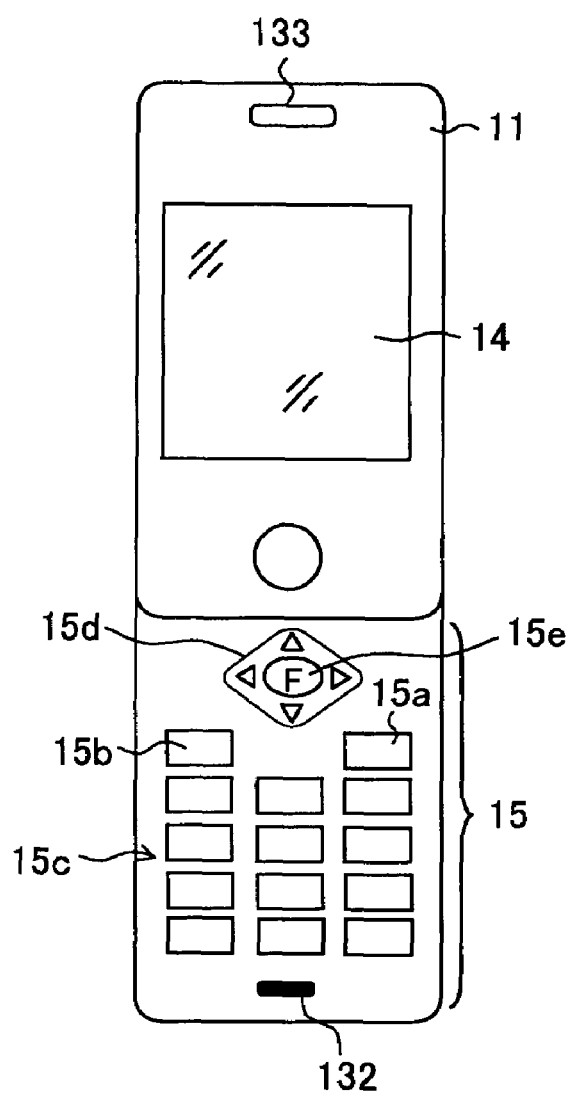
Figure 2:
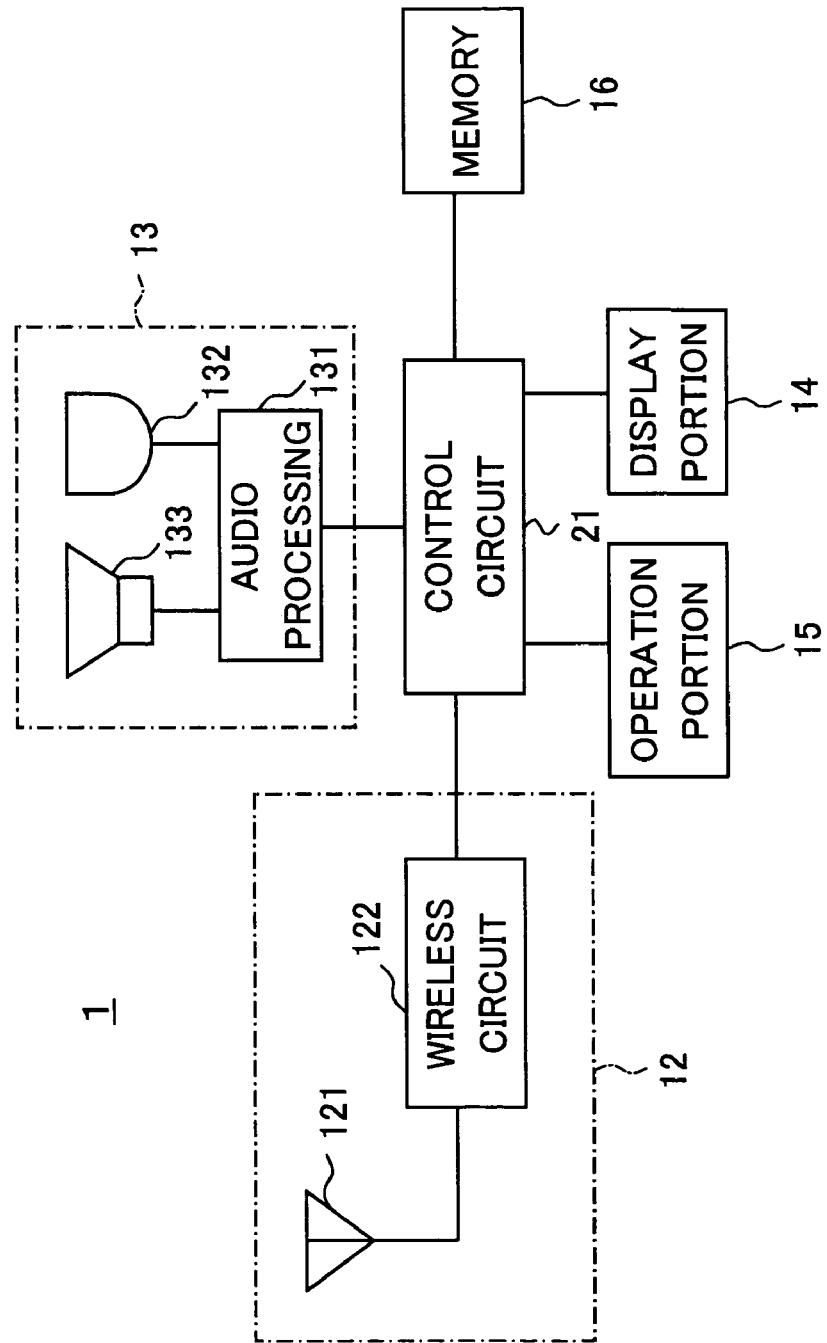
FIG. 2 is a block diagram of an example of the configuration of the main circuits of a mobile phone according to a preferred embodiment of the present invention.

FIGS. 1A and 1B are views of the appearance of a mobile phone according to a preferred embodiment of the present invention. FIG. 1A shows the state where the mobile phone case is closed, while FIG. 1B shows the state where the mobile phone case is opened. FIG. 2 is a block diagram of an example of the configuration of the main circuits of a mobile phone according to a preferred embodiment of the present invention.

Note that the "standby screen" in the preferred embodiments, as explained earlier, means the initial screen displayed when turning on the mobile phone and not yet communicating.

Further, the predetermined screen according to the present invention (hereinafter sometimes also called the "first screen") corresponds to the standby screen with the later explained windows arranged on it.

The mobile phone 1, as shown in FIGS. 1A and 1B and FIG. 2, has a main case 11, a wireless communication portion (hereinafter simply referred to as a "communication portion") 12, an audio processing portion 13, a display portion 14, an operation portion 15 as an input portion, a memory 16 as a storage portion, a control circuit 17 as a control portion, and a movable mechanism 18.

The communication portion 12 is comprised of a transmitting/receiving antenna 121 and a wireless circuit 122.

The transmitting/receiving antenna 121 is built into the main case 11 at the side where the display portion 14 is provided.

The wireless circuit 122 uses radio waves for wireless communication. It modulates audio information, ID, web page data browsing requests, and other information processed by the control circuit 17 and transmits it from the antenna 121 to a not shown base station.

Further, the wireless circuit 122 demodulates page data, audio information, and other various information wirelessly transmitted from a base station and received by the antenna 121 and outputs it to the control circuit 17.

The audio processing portion 13 has an audio processing circuit 131 to which a microphone 132 for audio input and a speaker 133 for audio output are connected for the call function.

The audio processing circuit 13 performs predetermined processing on the audio input from the microphone 132 and supplies the result to the control circuit 17.

Further, the audio processing circuit 131 performs predetermined processing on the audio information supplied from the control circuit 17 and outputs it from the speaker 133.

As shown in FIGS. 1A and 1B, the microphone 132 is arranged under the operation portion 15 of the main case 11, while the speaker 133 is arranged at the top of the display portion 14.

The display portion 14, as shown in FIGS. 1A and 1B, has a liquid crystal display (LCD) or other display device arranged at the top side of the main case 11 and displays the telephone number input for the call function, various types of messages, memos including text data etc., etc.

Further, the display portion 14 is used as a guide display for displaying at for example the topmost line the type of mode, radio waves strength, remaining battery power, etc.

The display portion 14 operates in two modes: a normal mode and power saving mode. The normal mode is the mode for display of the standby screen, while the power saving mode is the mode where the backlight of the display portion 14 is turned off when the operation portion 15 is not operated for a certain time in the state of the standby screen.

In particular, the display portion in the preferred embodiments can display on the standby screen a plurality of windows (data display regions) of predetermined sizes called "attached memos" as predetermined images (first screens) overlapping the background display of the standby screen under the control of the control circuit 17.

Further, in the preferred embodiments, two types of windows are set: small windows for displaying only symbols and large windows displaying symbols and text data or part of the same.

These windows are displayed on the display portion 14 over the standby screen, so the existence of memos can be effectively impressed upon the user.

Further, in the preferred embodiments, it is possible to not only attach the first screen on the standby screen, but also similarly attach windows on the second screen in the same way as the first screen. Further, by depressing (operating) a predetermined key of the operation portion 15, it is possible to make the display portion alternately display the two screens.

The operation portion 15, as shown in FIGS. 1A and 1B, is arranged at the bottom side of the main case 11 and has an end (hangup)/power key 15a, a start (call) key 15b, a plurality of tenkeys 15c corresponding to numerals etc., a navigation key 15d, a center key 15e, etc.

The memory 16 as the storage portion is for example comprised including an EEPROM and stores a control program for sending and receiving calls and e-mail, an Internet browser, message data, an address book in which names and telephone numbers are recorded, etc.

The memory 16 further has data corresponding to attached memos (attached memo data) stored in it. The attached memo data is table data comprised of sets of text data, symbol data, display flags, and window display position data. More specifically, the attached memo data is comprised of, for every data recorded as an attached memo, a set of not only link data corresponding to that data, but also display text data to be displayed in the window, symbol data, display flag, and window display position data.

Here, the display text data is various data stored in the memory 16 or part of the same selected by the user through the operation portion 15. Further, the display text data is for example text data determined in accordance with a predetermined priority order from the text data included in the selected data. However, an upper limit is placed on the amount of the text data displayed in each window displayed on the display portion 14. In the preferred embodiments, the upper limit is eight words, so the first eight words of the determined text data become the display text data.

The symbol data is an identification symbol set so that the user can easily identify the attributes of the memo when an attached memo is displayed on the display portion 14. It is linked with image data, icons, and other symbols stored separately with the symbol data.

Further, the "display flag" shows the display mode of the attached memo on the display portion 14.

Using the display flag, the control circuit 17 can control the display portion 14 so that for example the display portion 14 displays only symbols when the display flag is "1" and the display portion 14 displays symbols and text data (or part of the same) when the display flag is "0".

Further, the window display position data may be used to specify where on the display portion 14 the text data (or part of the same) or symbols should be displayed as windows. The display portion 14 is designed to enable a plurality of windows to be displayed on the standby screen arranged in the vertical direction. It may be used so that positions not overlapping with the background display portion of the standby screen (time display etc.) are selected on a priority basis.

The control circuit 17 is comprised mainly by a microcomputer and performs overall control over the mobile phone 1. For example, the control circuit 17 performs control for the wireless transmission and reception of various types of information at the communication portion 12, processing of audio information at the audio processing unit 13, control of the display of information at the display portion 14, processing in accordance with the information input at the operation portion 15, control for access to the memory 16 in accordance with the processing, etc.

Further, it controls the display portion 14 to display (attach) in parallel the attached memos on the standby screen based on the attached memo data stored in the memory 16.

The movable mechanism 18 supports one part of the main case 11 (side including display portion 14) and another part of the main case 11 (side including operation portion 15) in a horizontally swinging manner. Due to this, by horizontally pivoting the display portion side of the main case 11 from the closed state shown in FIG. 1A, it is possible to set it at the opened state shown in FIG. 1B.

First Embodiment

Next, the operation of a mobile phone 1 according to a first embodiment of the present invention will be explained with reference to FIG. 3 and FIG. 4.

Figure 3:
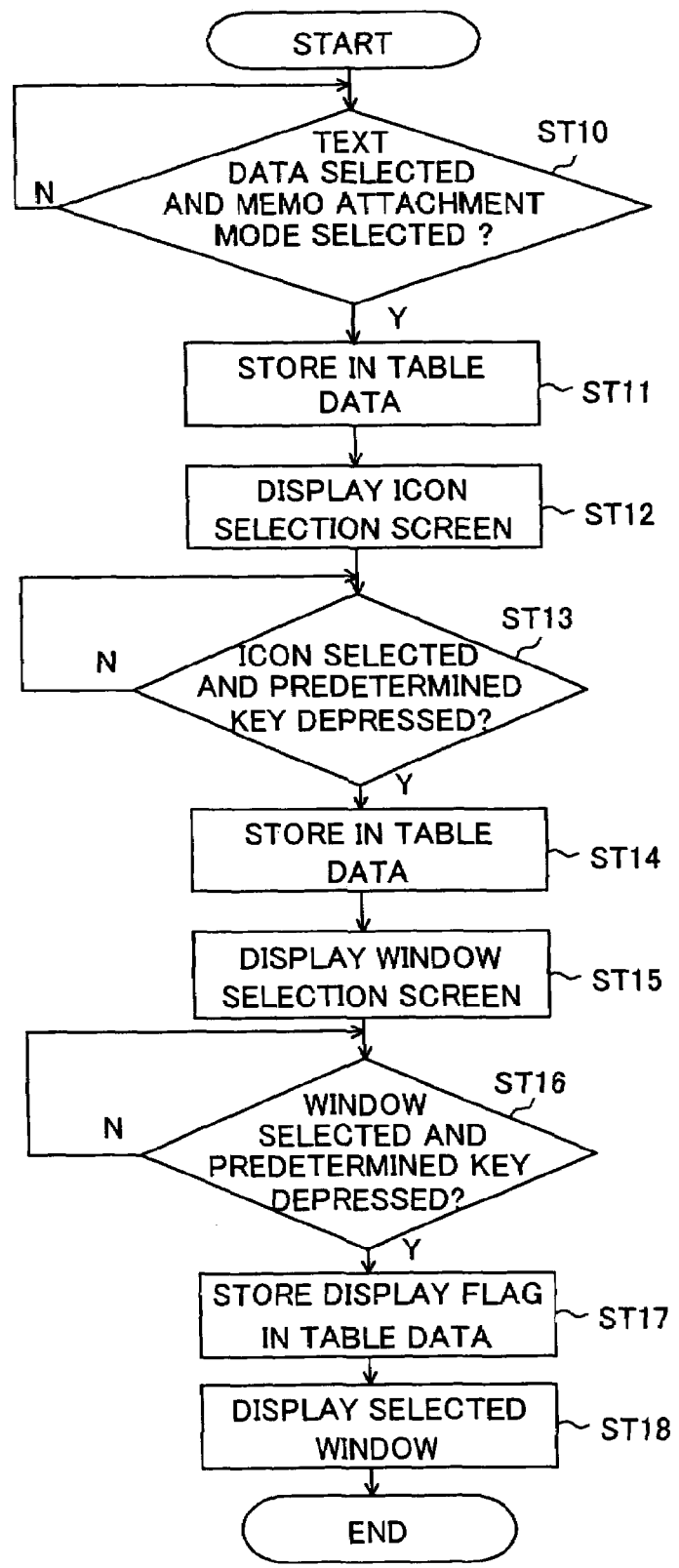
FIG. 3 is a flow chart for explaining the processing at the time of recording an attached memo in a first embodiment of the present invention.

FIG. 3 is a flow chart of the processing for recordal of an attached memo at the mobile phone 1. FIG. 4 is a view of the content of the display of the display portion 14 at the time of recording an attached memo at the mobile phone 1.

In FIG. 3, first the user selects the text data in the memory 16 (ST10).

In selecting the text data, it is possible to select various text data. For example, the selected text data may be data of a memo book or part of the text data of a received e-mail.

The text data is selected by the user through the operation portion 15 and the selected text data is fetched in a not shown buffer.

Figure 4:
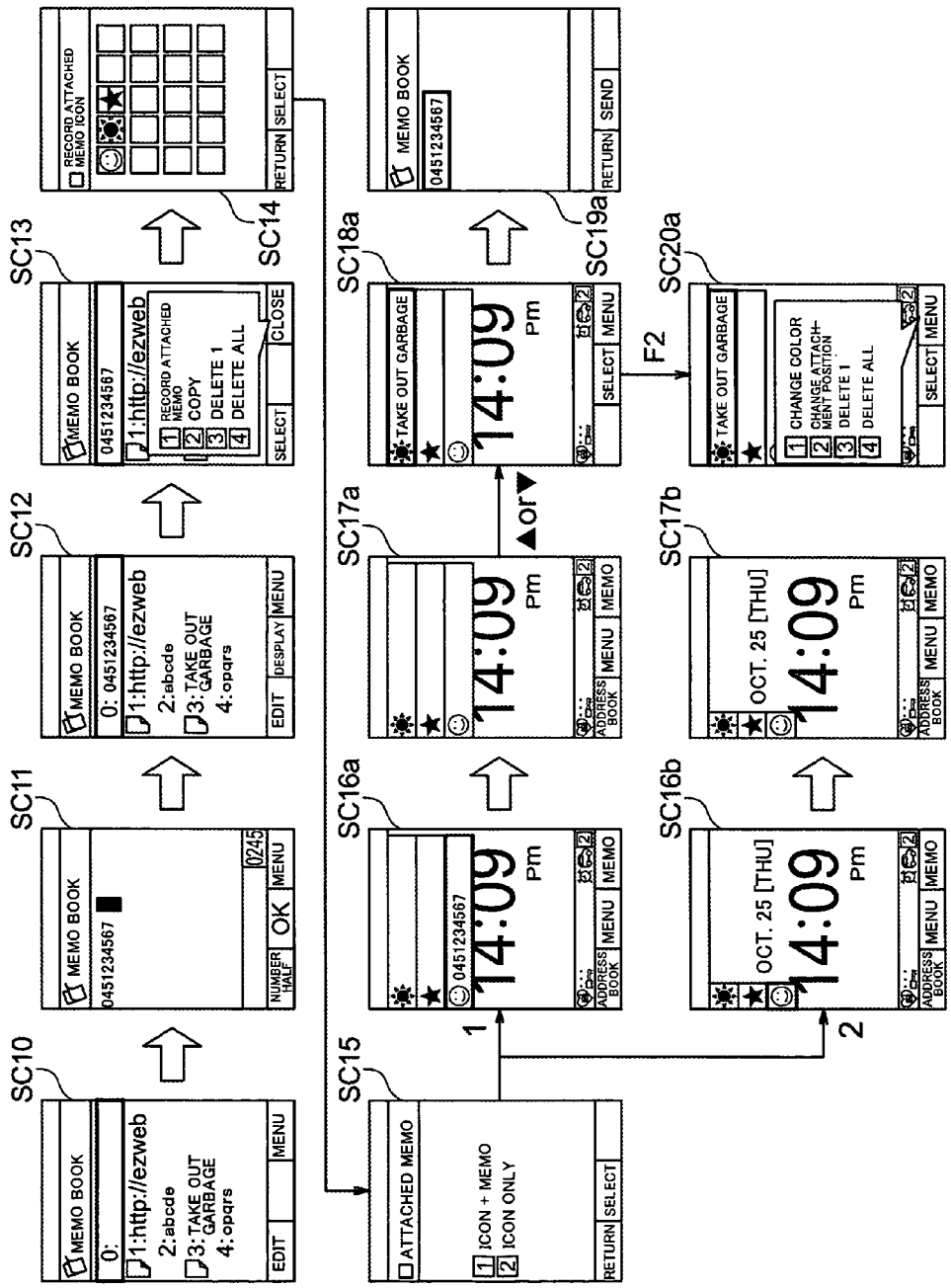
FIG. 4 is a view for explaining the operation of a display portion at the time of recording an attached memo in the first embodiment of the present invention.

In the example shown in FIG. 4, data of an identification number "0:" is selected from the data in the memo book (screen SC10) and 0451234567 (telephone number) is input to the selected data (screen SC11). Further, the input data can be displayed on a memo book screen (screen SC12). By depressing (operating) a predetermined key of the operation portion 15 to call up a sub menu and selecting "REGISTER ATTACHED MEMO" (screen SC13), the display portion 14 displays an icon (symbol) selection screen (screen SC14).

At this point of time, table data of attached memo data comprised of text data, symbol data, and a display flag is prepared in the memory 16, and the selected text data (0451234567) is stored in the table data (ST11).

Further, as shown in FIG. 4, since the icon selection screen is displayed (ST12 and screen SC14), if the user selects a desired icon (symbol) (ST13), the symbol data specifying the corresponding icon is stored in the table data of the attached memo data (ST14).

Next, a window selection screen is displayed (ST15 and screen SC15).

Two types of windows may be selected. It is possible to select a small window displaying only symbols (icon) or a large window displaying the text data or parts of the same (screen SC15).

The user selects the window, then, as shown by the screen SC16a, designates one vertical position in the window display regions, then depresses (operates) a predetermined key (ST16), whereupon a display flag and window display position data corresponding to the selected window are stored in the table data of the attached memo data (ST17).

After this, the display portion 14 displays a standby screen on which the attached memo is attached in accordance with the selected window display (ST18).

In FIG. 4, the screens SC16a to SC20a show the case where a large window display is selected, while the screens SC16b to SC17b show the case where a small window display is selected.

Here, if an attached memo is selected on the standby screen (screen SC18a) and a predetermined key is depressed, the display portion 14 displays a memo book screen and displays text data included in the selected attached memo (screen SC19a).

As clear from FIG. 4, the large window display enables part of the text data to be viewed, so there is the advantage that the content of the memo can be easily recalled. Further, the small window display secures the presence of the memos on the standby screen while improving the visibility of the background screen compared with the large windows, so when a user attaches a favorite image etc. to the background screen, there is the advantage that the memos can be displayed without hiding much of that image.

By successively recording attached memos in this way, the control circuit 17 arranges a plurality of windows successively in parallel on the display portion 14 (screens SC16a and SC16b).

Further, in the state with attached memos attached to the standby screen, the user can operate the navigation key 15d of the operation portion 15 to select one window from the windows of the plurality of attached memos.

It is possible to change the attached position on the screen SC18a obtained by selecting the window of an attached memo and depressing (operating) a predetermined key from the screen SC17a of FIG. 4.

That is, based on a window position change instruction from the user for the attached memo, the control circuit 17 updates the data relating to the attached position and displays it by a new attached position on the display portion 14.

By depressing (operating) a predetermined key at the screen SC18a, it is possible to call up a sub menu and delete recordal of an attached memo (erase it from memory 16).

As already explained, for the text data to be recorded in an attached memo, it is possible to extract and record various text data or parts of the same stored in the memory 16 of the mobile phone 1.

Figure 5:
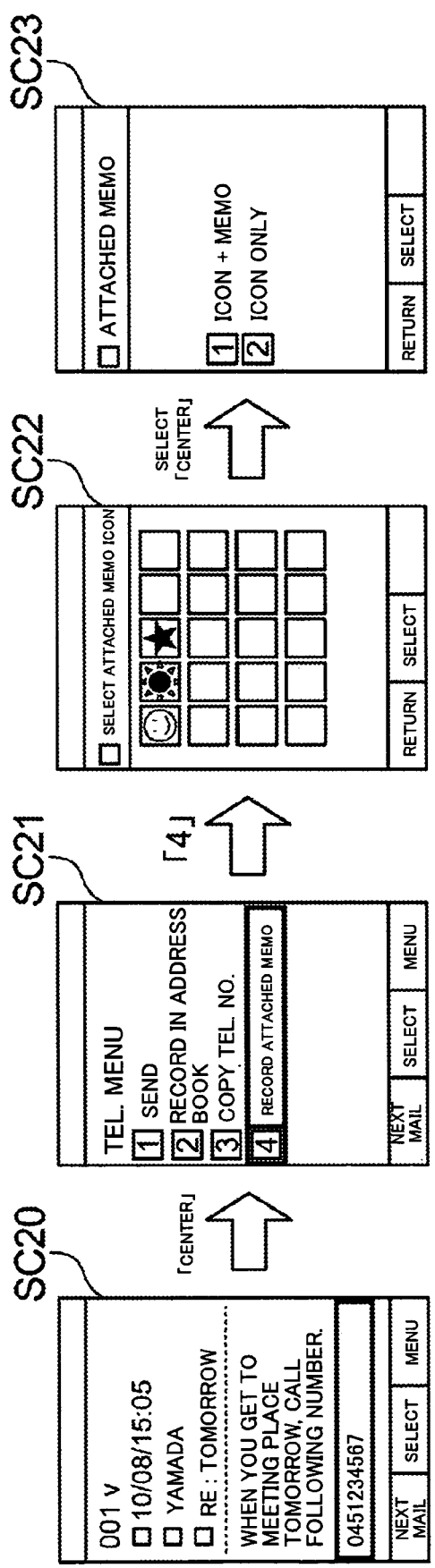
FIG. 5 is another view for explaining the operation of a display portion at the time of recording an attached memo in the first embodiment of the present invention.
Figure 6:
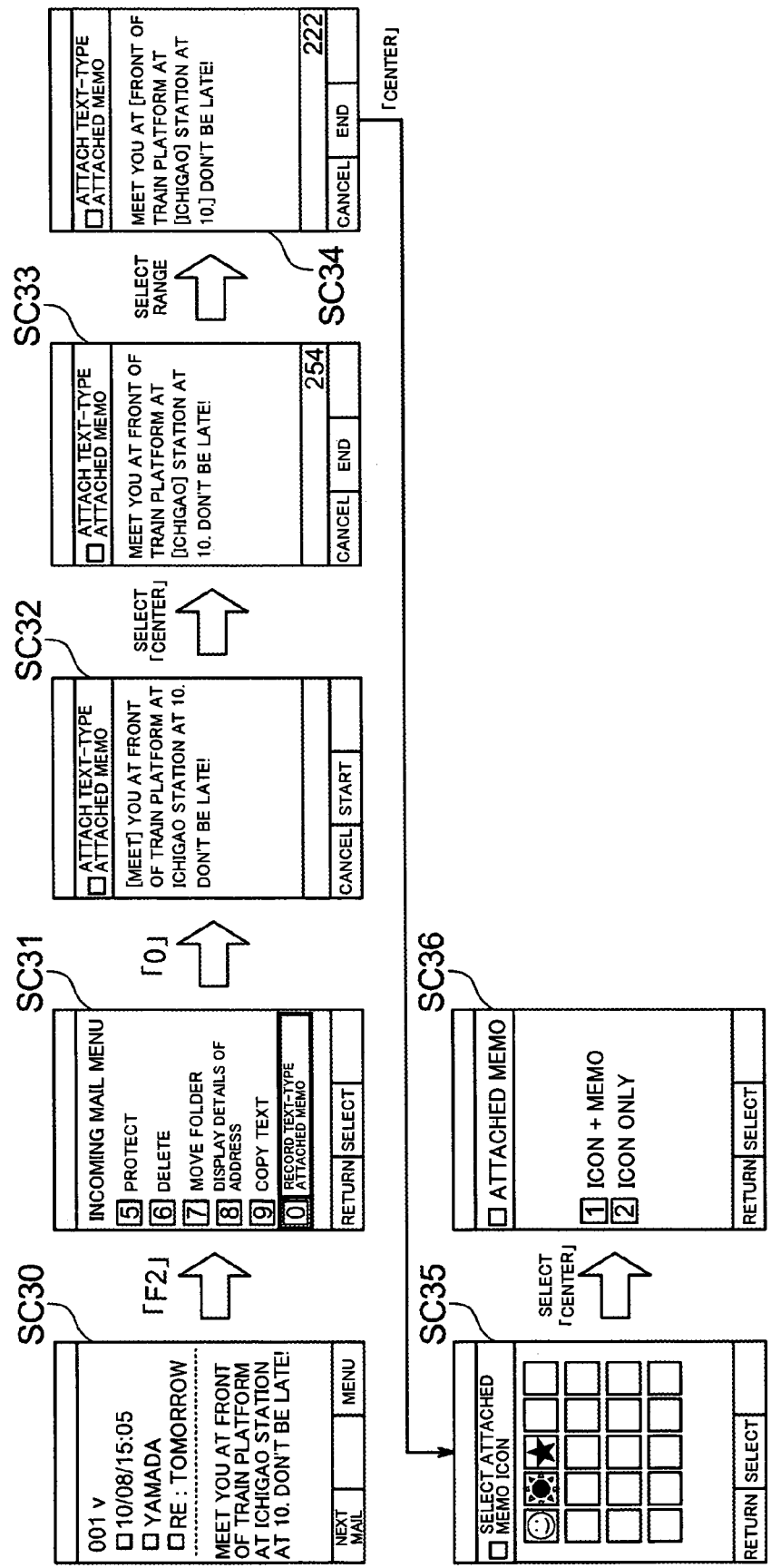
FIG. 6 is another view for explaining the operation of a display portion at the time of recording an attached memo in the first embodiment of the present invention.

FIG. 5 and FIG. 6 are views illustrating the display operation of the display portion 14 in the case where text data in a received e-mail is recorded in an attached memo.

The screens SC20 to SC23 of FIG. 5 show the display operation of the display portion 14 in the case of recording in an attached memo the text data of part of an e-mail received by the mobile phone 1.

In FIG. 5, part of the received e-mail, that is, the telephone number "0451234567", is selected by the navigation key 15d etc. By operating a predetermined key, the control circuit 17 operates so as to shift to the attached memory recordal screen.

The screens SC30 to SC36 of FIG. 6 show the display operation of the display portion 14 in the case of recording in an attached memo the text data of part of an e-mail received by the mobile phone 1.

In FIG. 6, the message of part of the received e-mail is selected by the navigation key 15d etc. By operating a predetermined key, the control circuit 17 operates so as to shift to the attached memory recordal screen.

In both cases, the operation whereby the text data is selected and stored in the table data of the attached memo in the memory 16 and the symbol data and display flag are successively stored in the table data is similar to the operation explained using FIG. 3 and FIG. 4.

As explained above, according to the mobile phone 1 in the first embodiment, provision is made of a display portion 14 displaying a standby screen, an operation portion 15 including a plurality of keys, and a control circuit 17 able to display in parallel attached memos corresponding to text data which a user extracts from a memory converted to windows having certain display regions and controlling the display portion 14 to display at least part of the text data in the windows, so the user does not have to operate a key of the operation portion 15 to display memo contents. The memo contents are constantly displayed on the standby screen, so it is possible to easily recall the memo business.

Further, by the user changing the attached positions and deleting no longer required attached memos, it is possible to adjust the attached memos so as to minimize the effect on the background image etc. of the display portion.

Further, two types of sizes of windows are set and the control circuit 17 controls the display portion 14 based on a display flag of table data of the attached memos stored by user input, so it is possible to select the display mode of the attached memos according to user's references.

That is, with a large window display, there is the advantage that viewing of part of the text data enables the user to easily recall the contents of the memos. Further, with a small window display, the presence of the memos is secured on the standby screen while the view of the background screen is improved compared with large windows, so there is the advantage that for example when a user attaches a favorite image etc. on the background screen, the memos can be displayed while minimizing the extent to which that image is concealed. The user can select the size of the windows according to his or her preferences. Further, if linking each text data with an icon selected considering the content, the user can recall the text content by just viewing the icons even with a small window display.

Note that in the present embodiment, the example of two types of sizes of windows being set was explained, but of course it is also possible to set a greater number of sizes of windows in accordance with the mobile phone specifications.

Second Embodiment

Below, a second embodiment of the present invention will be explained with reference to the attached drawings.

Note that the mobile phone of the second embodiment is configured similar to the mobile phone explained in the first embodiment.

The control circuit 17 of the mobile phone 1 in the second embodiment causes the display portion 14 to display character strings relating to telephone numbers, mail addresses, URLs, or other communication information included in text data of an attached memo by an appearance different from text data other than those character strings when an attached memo is opened (when the memo book screen is displayed) by an operation of the user.

For example, the control circuit 17 causes the display portion 14 to display by a blue color just the character strings relating to the above communication information.

In the state where the window of an attached memo is opened and just the character strings relating to communication information are displayed by a different appearance as explained above in the text data displayed on the memo book screen, if the user selects one communication information by operation of the navigation key 15d etc. and depresses a predetermined key, the control circuit 17 instructs the start of communication to the communication portion 12 based on the selected communication information.

In the communication portion 12, the wireless circuit 122 communicates wirelessly utilizing radio waves by modulating for example a request for browsing web page data and sending it by the antenna 121 to a not shown base station based on the telephone number, mail address, URL, or other communication information processed by the control circuit 17.

Figure 7:
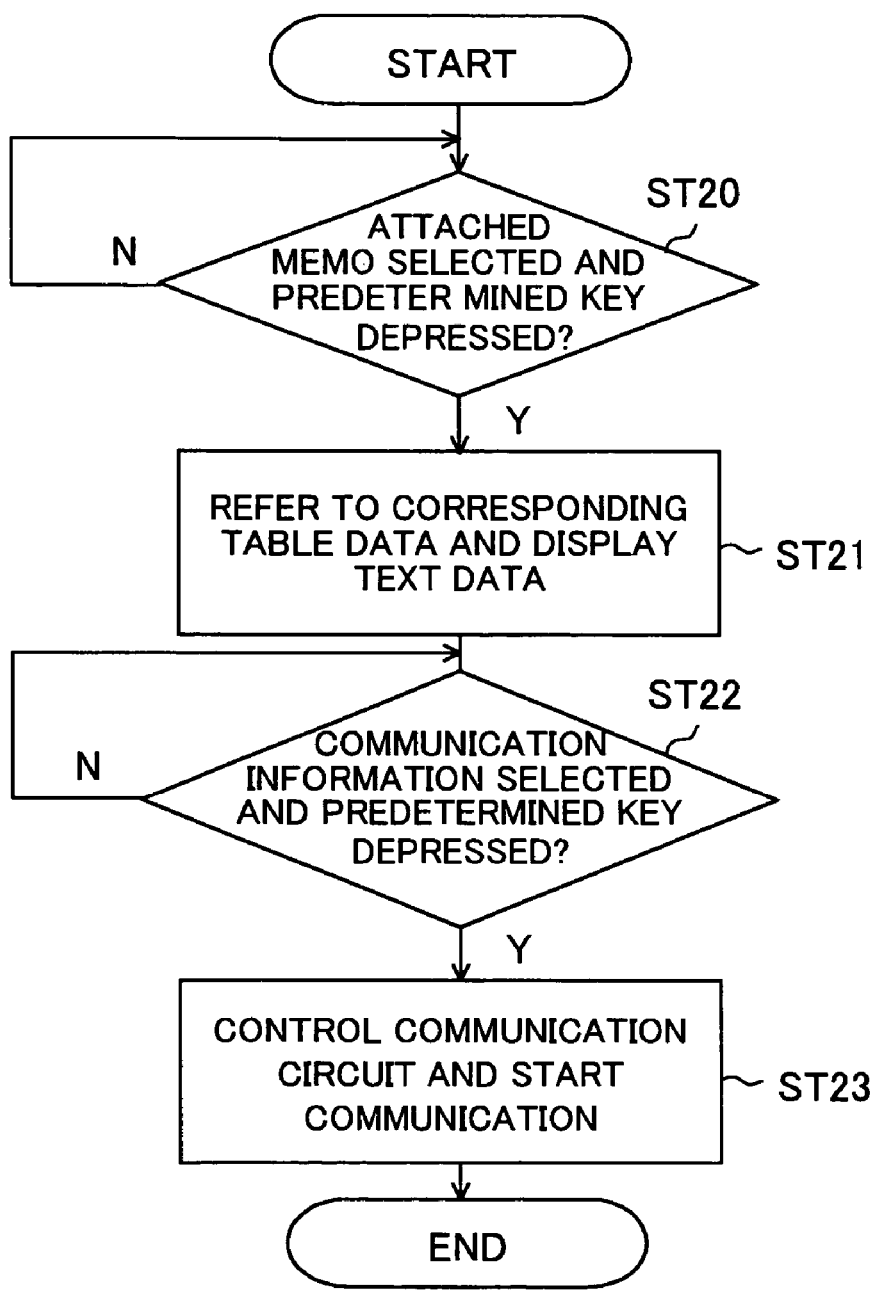
FIG. 7 is a flow chart for explaining communication start processing based on the content of an attached memo in a second embodiment of the present invention.

FIG. 7 is a flow chart for explaining the operation of a mobile phone in the second embodiment.

In FIG. 7, first, when an attached memo is selected on the standby screen and a predetermined key is depressed (ST20), the control circuit 17 refers to the table data in the memory 16 corresponding to the selected attached memo and causes the text data to be displayed on the display portion 14 (ST21).

At this time, the control circuit 17 judges whether to make a call, send e-mail, or connect to the Internet using as the destination any character string relating to a telephone number, mail address, URL, and other communication information included in text data of table data stored in the memory 16, changes text data and the appearance other than the character strings (underlining them, displaying them white, making them blink, etc.), and displays them on the display portion 14.

Further, when one character string is selected by the user and a predetermined key is depressed (ST22), the control circuit 17 controls the wireless circuit 122 to start the communication desired by the user (ST23).

Figure 8:
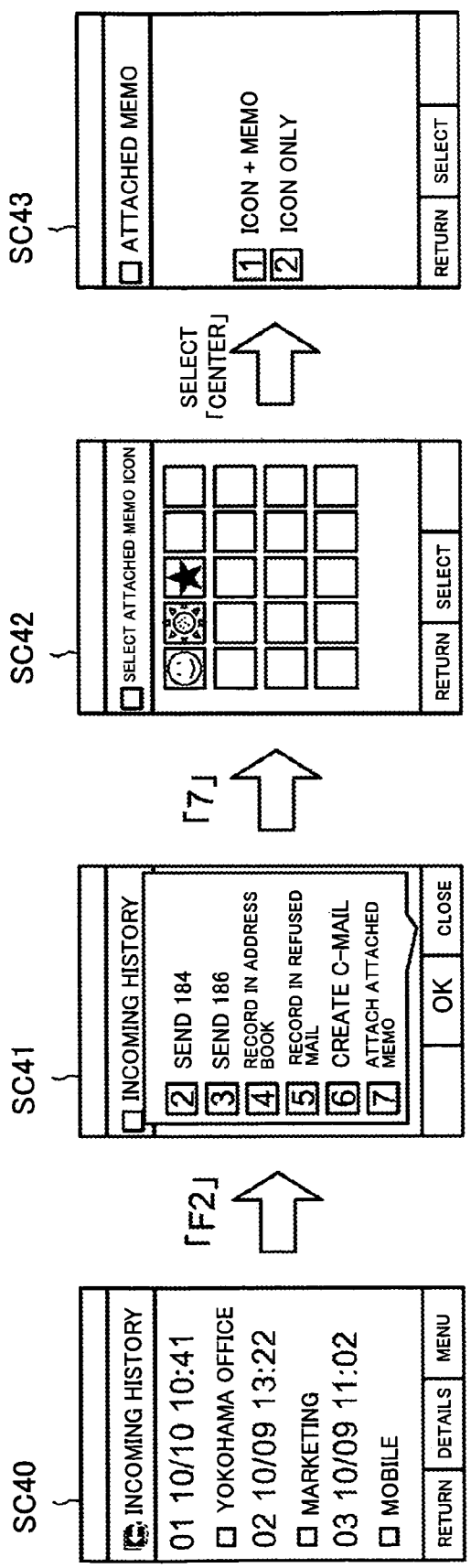
FIG. 8 is a view explaining the operation of the display portion at the time of recording an attached memo in the second embodiment of the present invention.
Figure 9:
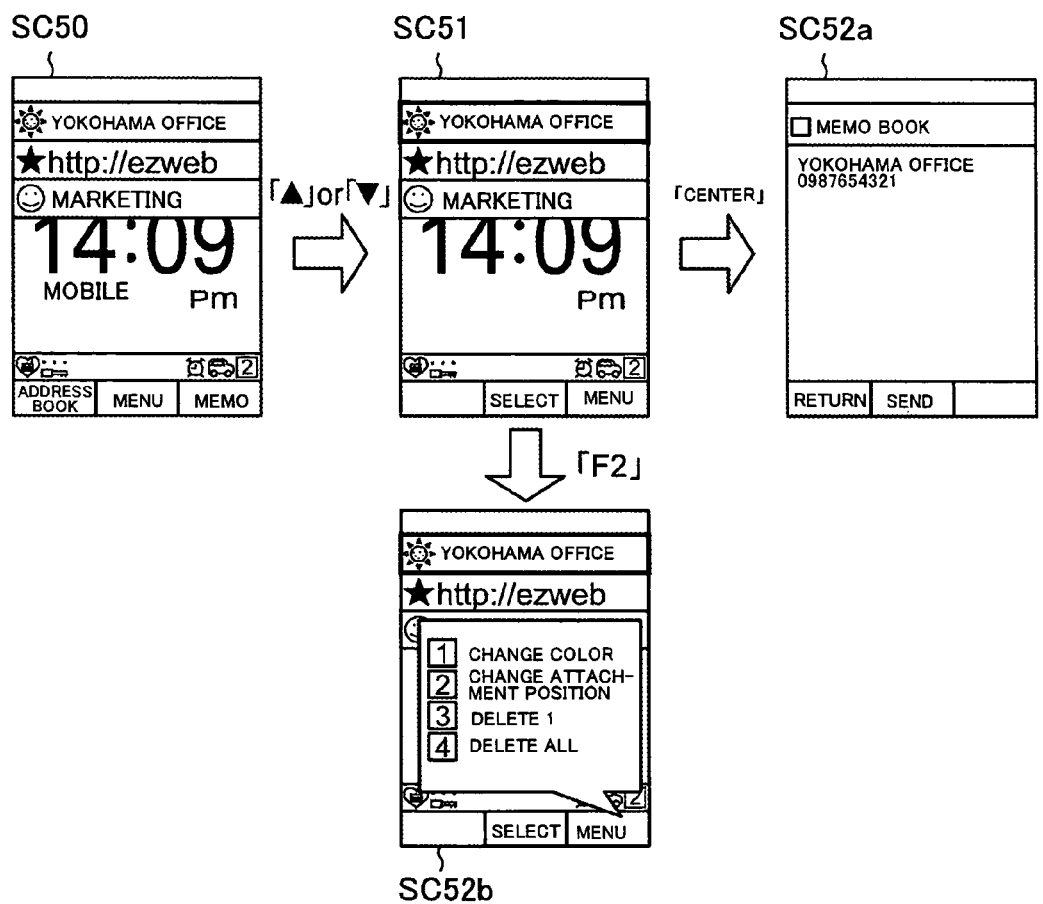
FIG. 9 is a view explaining the operation of the display portion at the time of executing the content of an attached memo in the second embodiment of the present invention.

FIG. 8 and FIG. 9 are views for explaining a display operation of a display portion 14 in a mobile phone according to the second embodiment.

FIG. 8 shows the display operation of the display portion 14 when recording for example incoming history data stored in the memory 16 as attached memos (screens SC40 to 43).

FIG. 9 shows the display operation of the display portion 14 when executing the content of an attached memo recorded as shown in FIG. 8 by a one-touch action (screens SC50 to 52a and 52b).

As shown in FIG. 8, when a telephone number among the incoming history data is recorded as an attached memo, when the telephone number is linked with text data showing the other party etc. in the incoming history data, the control circuit 17 controls the display portion 14 so as to display this by the format of "text data tel. no. (communication information)" on the window of the attached memo on the screen SC50 of FIG. 9.

Due to this, the recognition of the memo to the user is improved.

On the screen SC51 of FIG. 9, when the attached memo recorded at FIG. 8 is selected and a function key 15e or other predetermined key is depressed, "098765432" showing the telephone number is displayed by an appearance different from the other text data (screen SC52a).

In this state, if a function key 15e or other predetermined key is depressed, as explained above, the wireless communication is started. Specifically, the above telephone number is called.

As explained above, according to the mobile phone of the second embodiment, when character strings relating to a telephone number, e-mail address, URL, or other communication information are included in text data of an attached memo, when a user opens up the attached memo, the character strings relating to the communication information are made to be displayed on the display portion 14 by an appearance different from the text data other than the character strings. Further, when the user selects one communication information and depresses a predetermined key, the control circuit 17 instructs the start of communication to the communication portion 12 based on the selected communication information. Since the control circuit 17 is configured in this way, when the memo content includes communication information, it becomes possible to execute the communication content by a one-touch action based on that communication information.

As explained above, according to the first and second embodiments, since it is possible to attach a memo changeable by a mode in accordance with the user preferences, there is the advantage that the effect on the view of the standby screen can be kept to a minimum and the existence of memos can be impressed upon the user.

Third Embodiment

Below, a third embodiment of the present invention will be explained with reference to the attached drawings.

Note that the mobile phone of the third embodiment is configured similar to the mobile phone explained in the first embodiment.

Figure 10:
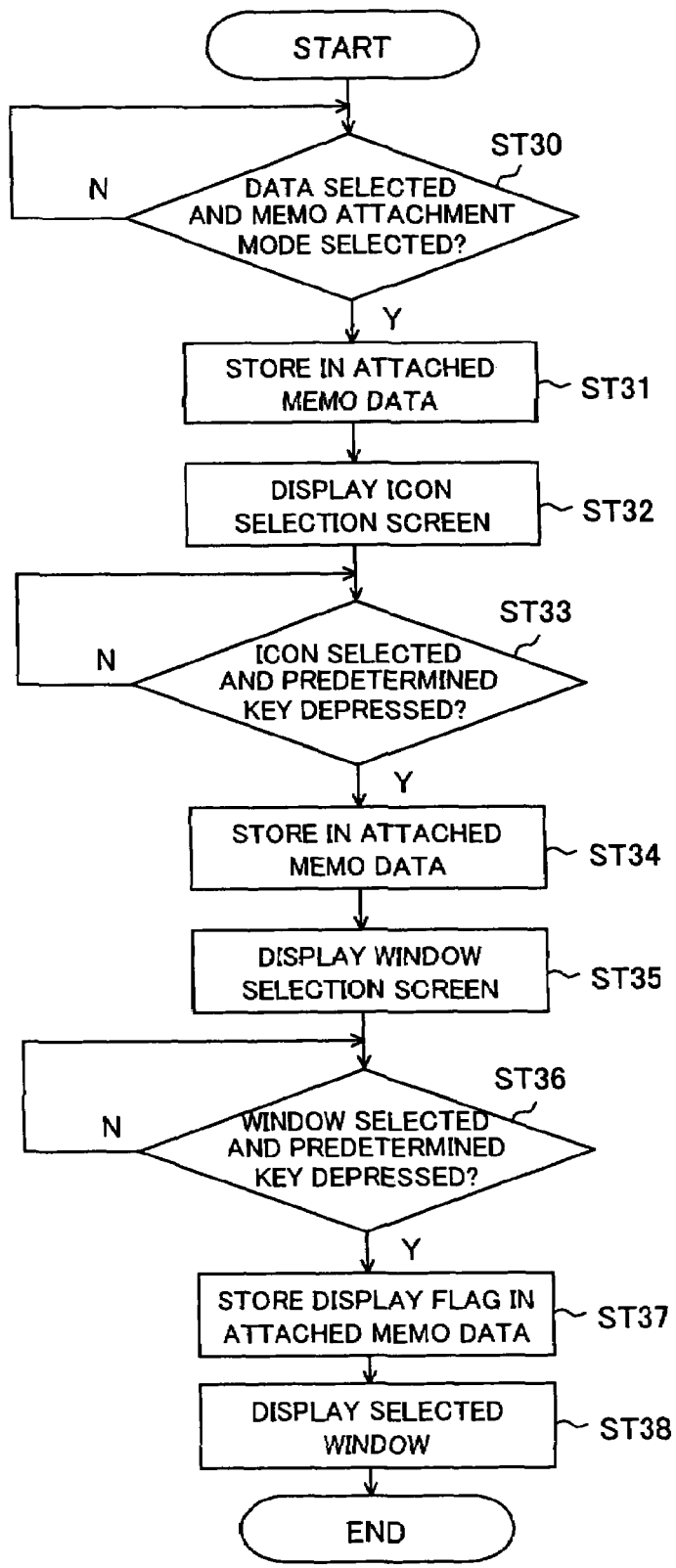
FIG. 10 is a flow chart of an example of the operation for recording an attached memo in a mobile phone according to a third embodiment of the present invention.
Figure 11:
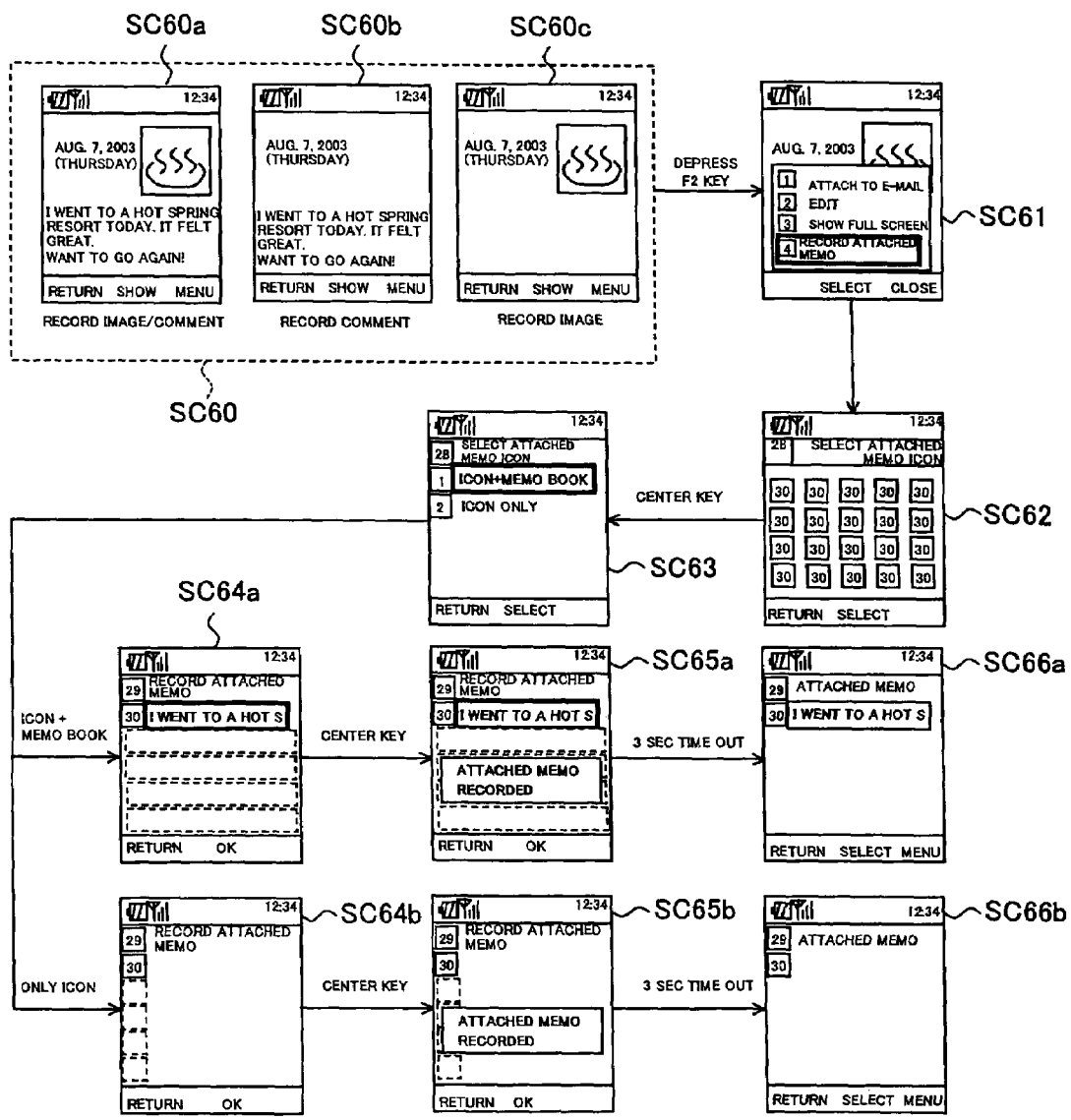
FIG. 11 is a view of an example of the operation of the display portion at the time of recording an attached memo in a mobile phone according to the third embodiment of the present invention.

Here, the operation of a mobile phone according to the third embodiment will be explained with reference to FIG. 10 and FIG. 11. FIG. 10 is a flow chart of the processing for recordal of an attached memo of a mobile phone. FIG. 11 is a view of the display content of the display portion 14 in the attached memo recordal processing of the mobile phone.

In FIG. 10, first, the user selects the data in the memory 16 (ST30). The selected data is for example text data (or part of the same) of the e-mail, image data from the camera function (not shown in FIGS. 1A and 1B), schedule data, or any other data created by execution of an application.

Such data is selected by the user through the operation portion 15, whereupon the selected data is fetched into a not shown buffer. Further, the attached memo data is created on the memory 16 and the first eight words "I WENT TO A HOT SPRING RESORT TODAY" of the text data "I WENT TO A HOT SPRING RESORT TODAY. IT FELT GREAT. WANT TO GO AGAIN!" included in the selected data is set as the display text data of the attached memo data (ST31).

The example shown in FIG. 11 shows the change of the screen of the display portion 14 when the photo album data (image data and/or text data) selected at the screen SC60 is recorded as the attached memo data.

When data is selected for recordal of an attached memo, the icon selection screen is displayed (ST32 and screen SC62). When the user selects the desired icon (symbol) (ST33), symbol data specifying the corresponding icon is set as the symbol data of the attached memo data (ST34).

Next, the window selection screen is displayed (ST35 and screen SC63).

There are two types of windows for selection: a small window for displaying only the symbol (icon) and a large window for displaying the text data or part of the same.

When the user selects a window, then, as shown in the screen SC64a, designates one position in the vertical array of the window display regions, then depresses (operates) a predetermined key (ST36), the display flag and window display position data in accordance with the selected window are set as the attached memo data (ST37).

After this, the display portion 14 displays the standby screen with the attached memo in accordance with the selected window display (ST38).

In FIG. 11, the screens SC64a to SC66a show the operation of the display portion 14 in the case of selection of a large window display, while the screens SC64b to SC66b show the operation of the display portion 14 in the case of selecting a small window display.

As clear from FIG. 11, the large window display enables part of the text data to be viewed, so there is the advantage that the content of the memo can be easily recalled. Further, the small window display secures the presence of memos on the standby screen while improving the view of the background screen compared with large windows, so when a user attaches a favorite image etc. to the background screen, there is the advantage that the memo can be displayed without hiding much of that image.

By successively recording attached memos in this way, the control circuit 17 arranges a plurality of windows successively in parallel on the display portion 14 (screens SC66a and SC66b).

Figure 12:
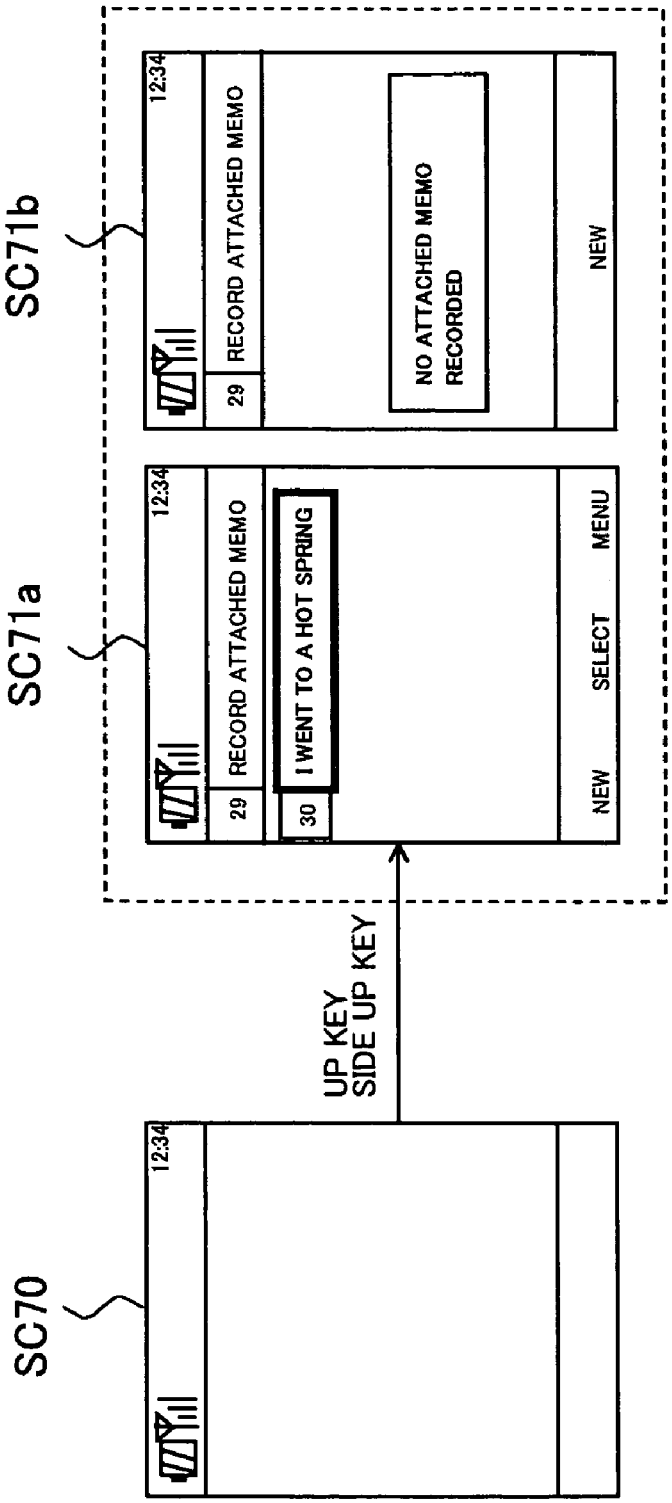
FIG. 12 is a view of an example of the operation of the display portion at the time of opening up an attached memo in a mobile phone according to the third embodiment of the present invention.

FIG. 12 is a view illustrating the operation when opening up an attached memo recorded in this way.

In FIG. 12, when operating the navigation key 15d or other predetermined key from the state of the standby screen (screen SC70), if attached memos have been recorded, a list of the attached memos is displayed (screen SC71a). If no attached memo has been recorded, the fact that no attached memo has been recorded is displayed (screen SC71b).

In the mobile phone 1 according to this embodiment, the attached memos can be opened up both in the closed state (FIG. 1A) and the opened state (FIG. 1B). In the closed state (FIG. 1A), while the operation portion 15 is not shown, it is possible to set an operation key at the side surface of the mobile phone 1.

Further, the screen SC71a of FIG. 12 only shows one attached memo recorded, but when a plurality of attached memos are recorded, the user can operate the navigation key 15d etc. to select one window from the window of the plurality of attached memos.

Further, by selecting the window of an attached memo in this way and depressing (operating) a predetermined key, it is possible to call up a sub menu and change the attachment position. That is, based on a window position changing instruction by the user for an attached memo, the control circuit 17 updates the window display position data in the attached memo data and makes the display portion 14 display the window at the new attachment position.

Further, by depressing (operating) a predetermined key), it is possible to call up a sub menu and delete recordal of an attached memo (erase it from the memory 16).

If attached memos are set on the standby screen in this way, by selecting an attached memo on the standby screen and depressing (operating) a predetermined key, the control circuit 17 will execute the corresponding application based on the link data of the attached memo data and display the results of execution on the display portion 14.

Figure 13:
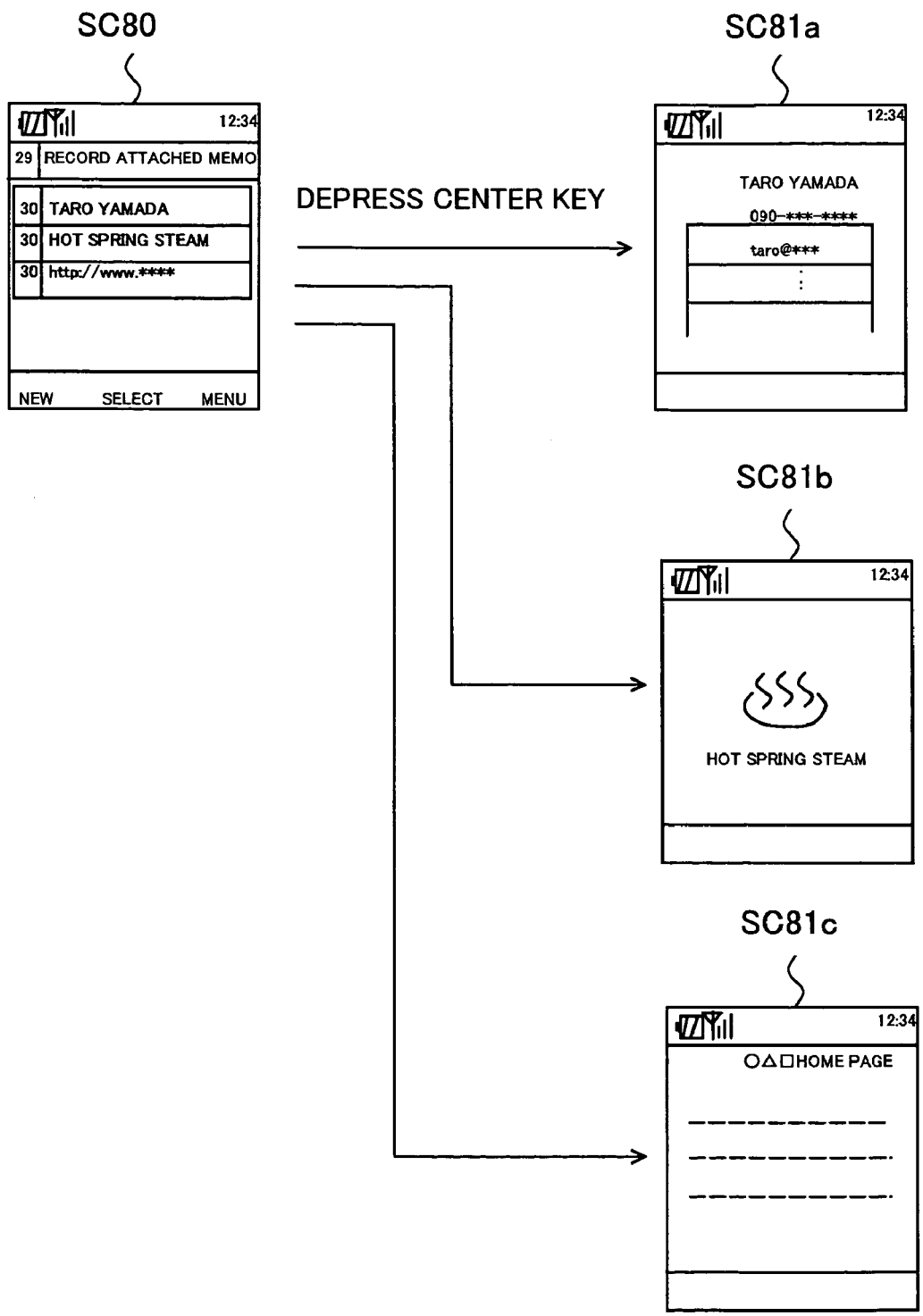
FIG. 13 is a view illustrating a state of execution of an application in an attached memo in a mobile phone according to the third embodiment of the present invention.

FIG. 13 shows an example of an application corresponding to the content of an attached memo being executed when a user selects an attached memo in the state with a plurality of attached memos attached to the standby screen.

In FIG. 13, the user selects the attached memo including the text for example "hot spring steam" from the plurality of attached memos on the standby screen and depresses a predetermined key such as the center key 15e. Upon this, the control circuit 17 opens the photo album data stored in the memory 16 by a predetermined application based on the link data of the corresponding attached memo data. Due to this, the screen displays the "hot spring steam" image and text data.

As explained above, according to the mobile phone in the third embodiment, provision is made of a display portion 14 displaying a standby screen, an operation portion 15 including a plurality of keys, and a control circuit 17 able to display in parallel attached memos corresponding to text data which a user extracts from a memory converted to windows having certain display regions and controlling the display portion 14 to display at least part of the text data corresponding to the extracted data in the windows. When the user selects one attached memo by operation of a predetermined key of the operation portion 15, the corresponding data is opened by the application and displayed on the display portion 14 based on the link data of the attached memo data.

Further, two types of window sizes are set. The control circuit 17 is configured to control the display portion 14 based on the display flag of the table data of the attached memo stored by user input.

Therefore, (1) The user does not have to search for data by a key operation of the operation portion 15. The memo content is constantly displayed on the standby screen. Therefore, the user can easily recall the extracted data.

(2) With a large window display, there is the advantage that viewing of part of the text data enables the user to easily recall the contents of the memos. Further, with a small window display, the existence of the memos is shown on the standby screen while the view of the background screen is improved compared with large windows, so there is the advantage that for example when a user attaches a favorite image etc. on the background screen, the memos can be displayed while minimizing the extent to which that image is concealed. The user can select the size of the windows according to his or her preferences. Further, the user can select small windows from the viewpoint of privacy.

Further, if linking each application data with icons selected considering the content, the user can recall the text content by just viewing the icons even with a small window display.

(3) By selecting the attached memo on the standby screen, it becomes possible to execute content of the corresponding data by a one-touch action.

Further, the invention is not limited to the above content and can be modified in various ways within the scope of the gist of the invention. For example, the text able to be displayed in a window was given as a maximum of eight words, but it is possible to change this in accordance with the size of the letters displayed or the size of the display portion 14.

Fourth Embodiment

Below, a fourth embodiment of the present invention will be explained with reference to the attached drawings.

Note that the mobile phone of the fourth embodiment is configured similar to the mobile phone explained in the first embodiment.

In the example of the above FIG. 11, part of the text data ("I WENT TO A HOT SPRING RESORT TODAY") included in the data created at the screen SC60 is set as the display text data of the attached memo data based on that created data, but the present embodiment can be configured so that the control circuit 17 selects the display text data for display in a window of an attached memo based on a predetermined priority order from the plurality of text data included in the recorded data.

FIG. 14 is a view of an example of the priority order.

In FIG. 14, (A) shows matter (data) which can be recorded in an attached memo, while (B) shows the priority order of the display text corresponding to the recordable order.

For example, in the case of a telephone number of an address book, this shows that rather than the text data of the telephone number itself, the text data showing the name recorded as the callee is displayed in the window on a priority basis. In the case of the photo album data explained using FIG. 11, there is no priority order. The comment included in the photo album data is displayed. Therefore, the initial eight words of the comment (in the example of FIG. 11, "I WENT TO A HOT SPRING RESORT TODAY") are displayed.

When displayed in windows regardless of the priority order shown in FIG. 14, the user can freely set the order from the viewpoint of how much the content of the data can be recalled from the content of the text data.

Further, based on the set priority order, the control circuit 17 records the text data of the data selected by the user, or part thereof, as the attached memo as display text data in the attached memo.

As explained above, according to the mobile phone of the fourth embodiment, the display text data for display in a window of an attached memo for each data to be recorded can be selected from the plurality of data included in the data to be recorded in accordance with a predetermined priority order, so it is possible to display text data to the user enabling him or her to more easily recall the content of the data and therefore the fun of operation of the user can be improved.

Fifth Embodiment

Below, a fifth embodiment of the present invention will be explained with reference to the attached drawings.

Note that the mobile phone of the fifth embodiment is configured similar to the mobile phone explained in the first embodiment.

In the third and fourth embodiments, the explanation was given limiting the attached memos to be displayed on the standby screen to the first screen. In this embodiment, it is made possible to display attached memos on another screen (second screen) different from the first screen on the standby screen.

In this embodiment, display screen data is added as the attached memo data. The display screen data for example can express by a 2-value flag data 0: "display on first screen" and 1: "display on second screen".

Note that the second screen according to the present invention corresponds to the second screen in the present embodiment and, as explained above, is a screen arranging windows for attached memos different from the first screen on the standby screen.

Regarding which screen to set the display screen at, in the third embodiment, in the operation for recordal of an attached memo explained using FIG. 10, for example, it is sufficient to set an additional step after the icon selection of step ST33 and to prompt the user to select the screen for display. Further, based on the selection by the user, the control circuit 17 sets as the above display screen data "0" in the case where the first screen is selected and "1" in the case where the second screen is selected.

Figure 15:
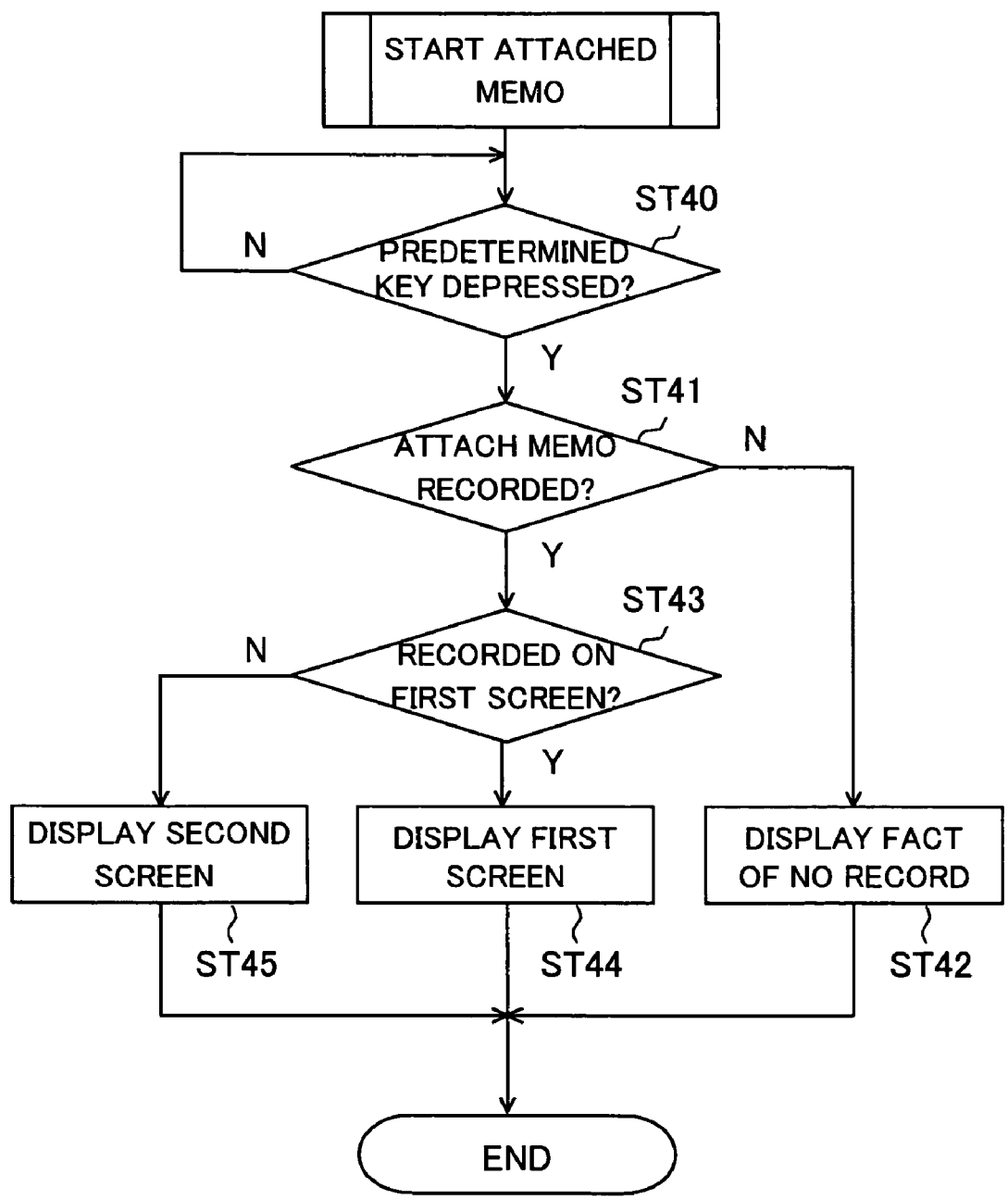
FIG. 15 is a flow chart of the operation when displaying attached memos in a mobile phone according to a fifth embodiment of the present invention on two screens.

FIG. 15 is a flow chart for explaining the operation of a mobile phone of the fifth embodiment.

The operation when starting up an attached memo after display image data is set in the attached memo recording operation as explained above will be explained in accordance with the steps of FIG. 15.

In FIG. 15, if operating the navigation key 15d or other predetermined key of the operation portion 15 from the state of the standby screen (ST40), it is checked if an attached memo has been recorded (ST41). If no attached memo has been recorded, the fact that no attached memo has been recorded is displayed (ST42).

If an attached memo has been recorded, it is checked if it was recorded on the first screen, that is, if the display image data is set to "0". When set to "0", the standby screen displays the first screen (ST44), while when set to "1", the standby screen displays the second screen (ST45).

Basically, the control circuit 17 checks the display screen data at the time of startup and makes the display portion 14 display the first screen on the standby screen on a preferential basis, but if a predetermined key is depressed (operated) by the user, the display screen data is checked again and the second screen is displayed on the standby screen.

Therefore, the operation of step ST43 is performed for all attached memos recorded. As a result, the first screen on the standby screen displays all of the attached memo data for which the display screen data is set to "0". When the user operates a predetermined key and desires the second screen, all of the attached memo data for which the display screen data is set to "1" is displayed. Therefore, for example, it is possible to selectively make the attached memos not desired to be revealed to a third party be displayed at the second screen and accordingly the convenience to the user is improved.

The invention is not limited to the above content and may be modified in various ways in this embodiment.

For example, in the processing for recording attached memos explained using FIG. 10 and FIG. 11 in the third embodiment, if configuring the control circuit 17 to make the display screen data "0" when the user selects only icons at step ST33 (screen SC63 of FIG. 11) and make the display screen data "1" when the user selects icons and text data, the standby screen will display only the icons (symbols) at all times and therefore user privacy, whereby only icons (symbols) are displayed at all times and the content of the text can no longer be viewed, will be secured.

Further, conversely, if configuring the control circuit 17 to make the display screen data "1" when the user selects only icons at step ST33 (screen SC63 of FIG. 11) and make the display screen data "0" when the user selects icons and text data, the standby screen will display the text data as well at all times and therefore the user can easily recall the content of the data.

Further, in the present embodiment, only one screen was set as an additional screen for setting the windows of the attached memos, but it is also possible to set further additional screens. In this case, the display screen data may be made not flag data, but 2-bit or more data and the display screen data may be set at the time of recordal in the manner of "0" meaning display on standby screen, "1" as meaning display on the second screen, "2" as meaning display on the third screen, etc.

Sixth Embodiment

Below, a sixth embodiment of the present invention will be explained with reference to the attached drawings.

Note that the mobile phone of the sixth embodiment is configured similar to the mobile phone explained in the first embodiment.

In the sixth embodiment, it is possible to switch between display and nondisplay of attached memos on the standby screen (or second screen) by operating a predetermined key.

Figure 16:
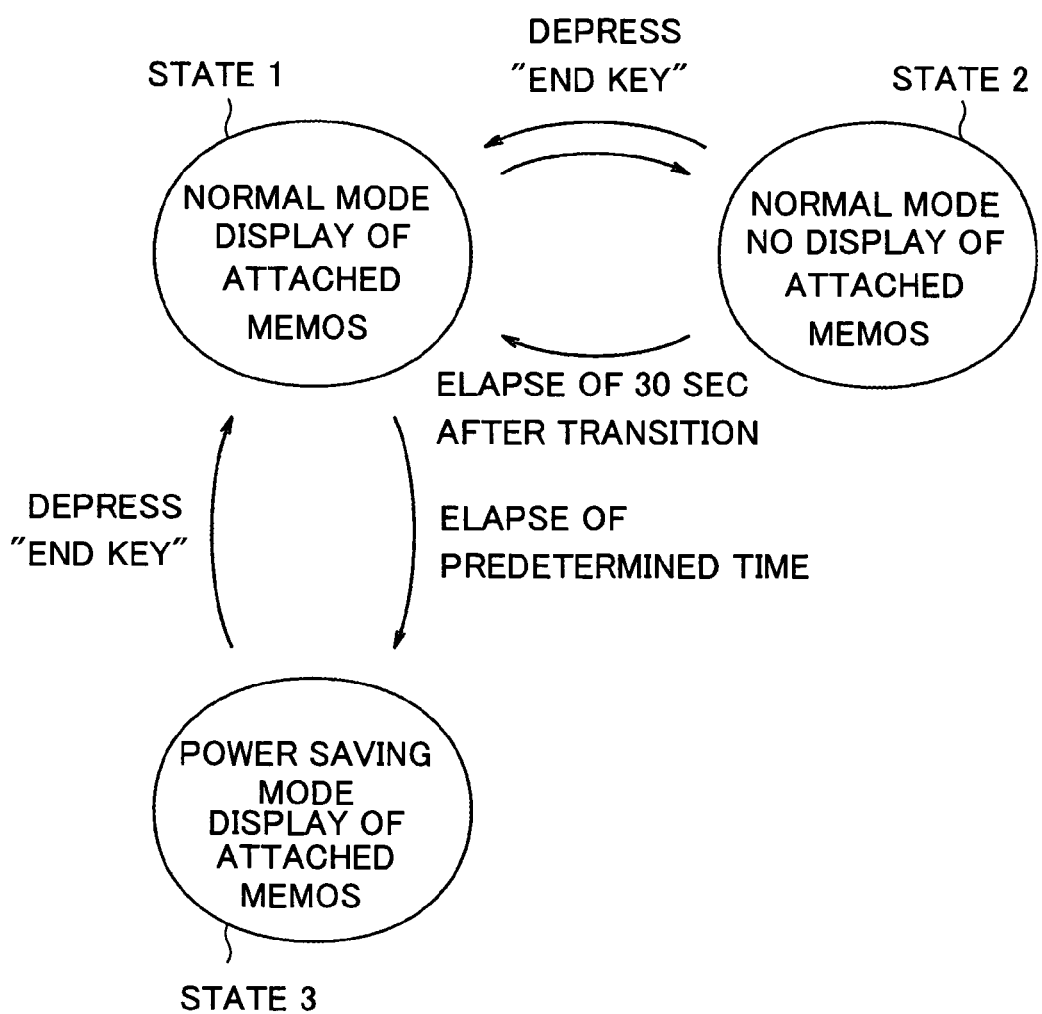
FIG. 16 is a status transition diagram of the operation of a display portion of a mobile phone according to a sixth embodiment of the present invention.

FIG. 16 is a status transition diagram of the display/nondisplay of attached memos on a standby screen.

In FIG. 16, the state 1 is a normal mode of the display portion 14 displaying attached memos. The normal mode differs from the power saving mode in that the backlight operates. The state 2 is a normal mode of the display portion 14 not displaying attached memos. Further, the state 3 is a power saving mode of the display portion 14 displaying attached memos.

Attached memos have important functional value in impressing upon the user the existence of memos, so it is desirable to attach them to the standby screen as much as possible to set a state enabling easy viewing.

However, even when a plurality of attached memos have already been recorded and the standby screen displays a plurality of windows, sometimes it is desired to confirm the underlying content displayed on the standby screen. For example, when the standby screen displays the date and time and part of this is hidden by the windows of the attached memos, sometimes the user desires to confirm the hidden part or the user wants to view his or her favorite image attached to the standby screen.

Therefore, it is possible to meet with such user desires by designing the mobile phone so that by depressing a predetermined key etc., the windows of the attached memos are switched between the display/nondisplay state.

In FIG. 16, for example by the user depressing the "end key" 15a, the control circuit 17 controls the display portion 14 to switch between display/nondisplay of the windows of the attached memos. That is, control is performed to successively switch between the state 1 and state 2.

Further, in FIG. 16, the control circuit 17 controls the display portion 14 so as to return to the display of the state 1 after the elapse of a predetermined period, for example, 30 seconds, after the shift from the state 1 to the state 2. That is, as explained above, the attached memos have important functional value in impressing upon the user the existence of memos and the standby screen is desirably made to show them attached as much as possible, so the attached memos are displayed again after a predetermined time and there is no concern of the user forgetting to return to them.

Further, after a predetermined time, along with the automatic transition from the normal mode to the power saving mode, the state 1 shifts to the state 3. The attached memos remain displayed between the state 1 to the state 3 from the above viewpoint.

Figure 17:
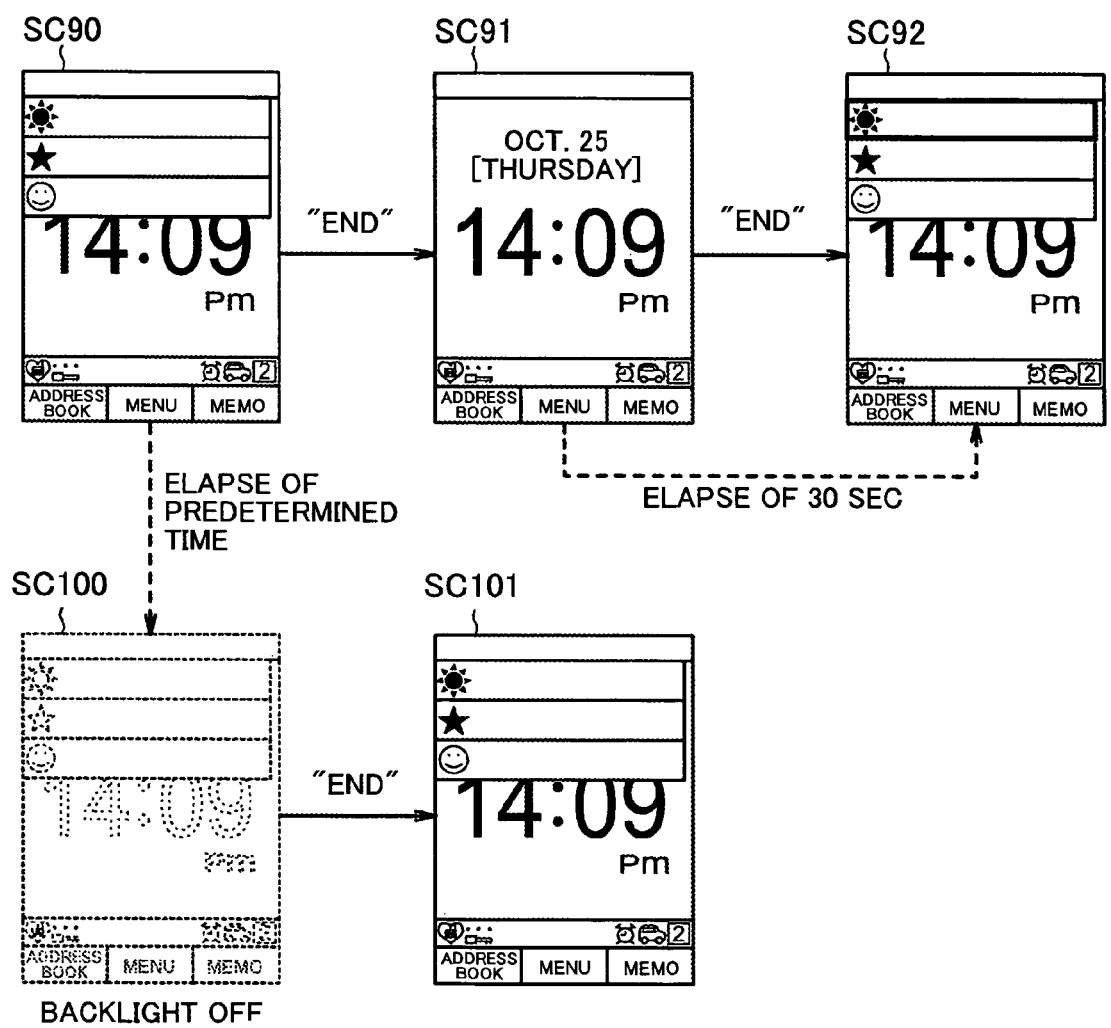
FIG. 17 is a view for explaining an operation for display and nondisplay of attached memos on a display portion of a mobile phone according to the sixth embodiment of the present invention.

FIG. 17 is a view illustrating by specific display screens the control of the display portion 14 by the control circuit 17 explained using the state transition diagram of FIG. 16.

In FIG. 17, when the user wishes to confirm the date and time part (screen SC90) hidden by the windows of the attached memos on the background screen, he or she may depress the "end key" 15a to turn off the display of the windows of the attached memos and then confirm the date and time (screen SC91).

As explained above, the control circuit 17 is additionally given a display/nondisplay selection function for displaying or not displaying the windows of attached memos on the display portion 14, so it is possible to turn off the display of the windows of the attached memos and confirm the standby screen as desired by the user. Therefore, the convenience to the user is further improved.

Further, even when designating nondisplay for the windows of the attached memos, they are made to be automatically displayed again after the elapse of a predetermined time, so there is no concern of the user forgetting to return to the attached memo display screen.

Note that in the present embodiment, the switching between the display/nondisplay of the attached memos is realized by the "end key" 15a of the operation portion 15, but it is of course also possible to switch by any key of the operation portion 15.

While the invention has been described with reference to specific embodiments chosen for purpose of illustration, it should be apparent that numerous modifications could be made thereto by those skilled in the art without departing from the basic concept and scope of the invention.

In addition, in the 1st to 6th embodiments, although explained using mobile phone as an example of communication apparatus, it is not restricted to this.

Furthermore, although the 1st to 6th embodiments were separately explained in order to simplify explanation, still more convenient communication apparatus which can respond to user's fine needs can also be offered by combining these.

What is claimed is:

1. A communications apparatus for wireless communications, comprising: a wireless communications portion, a display portion at least displaying a standby screen with an image selectable by a user when said communication apparatus is in a standby mode, an input portion including a plurality of keys including an END key operable to end communication by the wireless communication portion and to cause display of the standby screen, and operable such that a user selects a memo and a symbol representing that memo via the input portion, a storage portion storing at least text data of the memo, wherein the symbols are linked to the stored text data, and a control portion arranging data display regions on said standby screen in parallel and controlling said display portion so as to display on said data display regions at least part of said text data of the memo selected by said input portion, wherein said control portion switches between a text display mode and a symbol display mode when said display portion displays said data display regions, wherein in said text display mode, said display portion displays said symbols together with at least part of said text data in said data display regions, wherein, in said symbol display mode, said display portion displays said symbols without said text data in said data display regions and wherein the display portion has a first state displaying the data display regions on said standby screen and a second state not displaying the data display regions on said standby screen, and wherein the states are switch by operation of said END key.

2. A communications apparatus as set forth in claim 1, wherein said control portion causes data display regions of said symbol display mode to be displayed smaller than data display regions of said text display mode.

3. A communications apparatus as set forth in claim 1, wherein said display regions are selectable by input portion, and said control portion controls said display portion so as to change display order of arrangement about said data display regions selected by said input portion.

4. A communications apparatus as set forth in claim 1, wherein said display regions are selectable by input portion, and said control portion causes any of said data display regions to be stored in said storage portion linked with said text data, and causes text data corresponding to a selected data display region to be displayed on said display portion when one said data display region is selected said input portion is operated.

5. A communications apparatus as set forth in claim 4, wherein
said wireless communications portion transmits data based on communications information and
said control portion causes said display portion to display character strings which means said communication information differentiated with text data other than said character strings when said displayed text data has said character strings.

6. A communications apparatus as set forth in claim 5, wherein said control portion controls said wireless communication portion to start transmission based on said communication information linked with a said character string when said character string is selected and said input portion is operated.

7. A communications apparatus as set forth in claim 1, wherein
said storage portion storing execution data on which a predetermined application is to be executed, and
said control portion arranging data display regions on a predetermined screen on said standby screen in parallel and controlling said display portion so as to display on said data display regions information related to said execution data selected by said input portion,
wherein said execution data is stored linked with symbols in said storage portion,
and said control portion controls to display said symbols together with information related to said execution data on said data display regions.

8. A communications apparatus as set forth in claim 7, wherein said control portion arranges said data display regions on a second screen different from the predetermined screen in parallel, and controls said display portion so as to display one of said predetermined screen and said second screen in accordance with a predetermined operation of said plurality of keys.

9. A communications apparatus as set forth in claim 8, wherein said control portion changes display from one side to another side by predetermined operation of said plurality of keys while displaying the predetermined screen or second screen.

10. A communications apparatus as set forth in claim 7, wherein
said apparatus further has
first display mode that said control portion controls said display portion to display only symbols linked with said execution data, and
second display mode that said control portion controls said display portion display to display said symbols and data contained in said execution data
and said control portion selects said first display mode or second display mode as information related to execution data by operation of said plurality of keys.

11. A communications apparatus as set forth in claim 10, wherein said execution data contains various types of data and said control portion displays as execution data according to a predetermined order of priority.

12. A communications apparatus as set forth in claim 7, wherein
said apparatus further has
first display mode that said control portion controls said display portion to display only symbols linked with said execution data, and
second display mode that said control portion controls said display portion display said symbols and data contained in said execution data,
and said control portion selects said first display mode or second display mode as information related to execution data by operation of said plurality of keys, and sets one of predetermined screen and second screen to first display mode, and sets the other to second display mode.

13. A communications apparatus as set forth in claim 5, wherein said control portion controls said wireless communication portion to start transmission based on said communication information linked with a said character string when said character string is selected and said input portion is operated.

14. A communication apparatus as set forth in claim 1, wherein the data display regions are automatically set to the first state after a predetermined period of in action in the second state.

* * * * *